Dec. 6, 1966 H. V. MILES 3,289,848
APPARATUS FOR UTILIZING A TRAVELING FILTER BELT
Filed Feb. 14, 1963 4 Sheets-Sheet 1

INVENTOR.
HARRY V. MILES
BY Philip Mintz
ATTORNEY.

INVENTOR.
HARRY V. MILES
BY Theodore M. Jablon
ATTORNEY.

INVENTOR.
HARRY V. MILES
BY Theodore M. Jablon
ATTORNEY.

United States Patent Office 3,289,848
Patented Dec. 6, 1966

3,289,848
APPARATUS FOR UTILIZING A TRAVELING FILTER BELT
Harry V. Miles, Westport, Conn., assignor to Dorr-Oliver Incorporated, Stamford, Conn., a corporation of Delaware
Filed Feb. 14, 1963, Ser. No. 258,964
3 Claims. (Cl. 210—391)

This application is a continuation-in-part of applicant's application Serial No. 90,502 filed February 20, 1961, now abandoned.

This invention relates to improvements in the construction and operation of devices utilizing travelling webs of flexible resilient material. In one aspect, this invention more particularly relates to an apparatus for discharging filter cake from such a traveling web utilized as the filter medium in a filter. In another aspect, this invention more particularly relates to an apparatus for minimizing any tendency of the central portion of such traveling web to lead or lag with respect to the edges of such traveling web when such traveling web is utilized as an endless belt.

In the environment within which the present invention was developed, a traveling web endless belt filter having a rotating vacuum filtration drum and a plurality of auxiliary rolls is provided with an endless belt filter medium which moves continuously around and is supported by the aforementioned elements. During operation of such a filter, it is important to remove the filter cake completely from the filter medium and to correct for any tendencies of various portions of the endless belt across the width thereof to advance with respect to other portions (as would be evidenced by a straight transverse seam of such endless belt acquiring some other shape).

It is an object of this invention to provide an improved filter cake discharge roll for such a traveling belt filter which will provide for a superior release of the filter cake from the filter medium by concomitant longitudinal flexing and transverse stretching of the filter medium.

It is a further object of this invention to provide a roll construction around which an endless belt of flexible resilient construction is trained, which roll construction is adjustable to correct for deviations from proper transversal alignment of such endless belt, i.e., by correcting for tendencies of straight transversal seams to acquire other shapes.

These objects, and other objects of this invention as will become apparent as the specification proceeds, are mainly achieved through the use of a bowed roll as the cake discharge roll, said bowed roll having the plane wherein its axis lies located generally perpendicular to and capable of reciprocation into and out from the bisector of the angle made by the endless belt in passing around such bowed roll.

For a clearer understanding of the present invention, reference may be had to the following description read in conjunction with the accompanying drawings illustrating a specific embodiment of this invention wherein.

Figure 1:
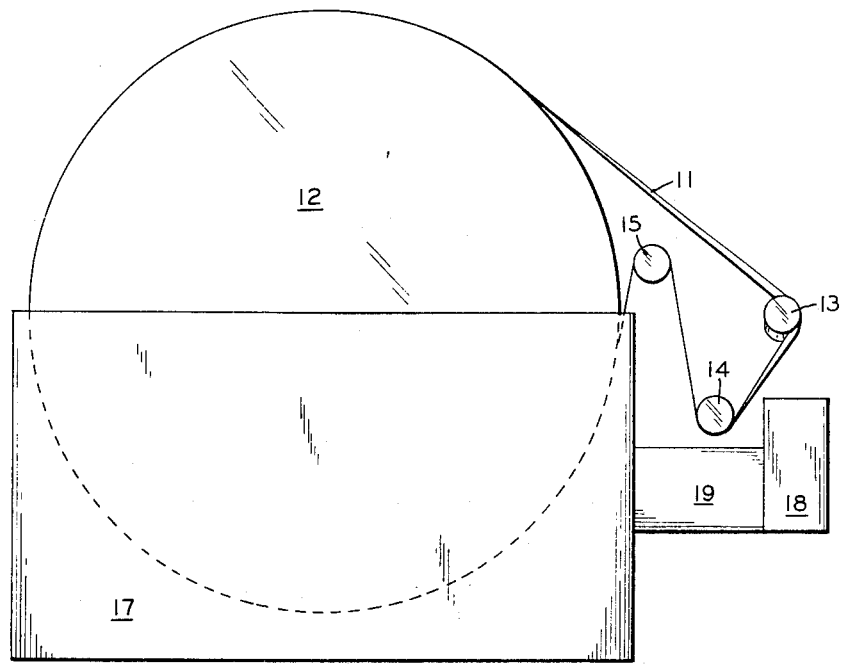
FIG. 1 is a schematic side view of a traveling web endless belt filter in accordance with the present invention, having many of the conventional parts omitted for the sake of clarity and to emphasize the novel construction.

Referring next to the drawings, and more particularly to FIG. 1, there is illustrated a continuous traveling web filter utilizing an endless belt of filter medium 11 which moves generally clockwise around rotating vacuum drum 12, cake discharge roll 13, tension adjusting roll 14, and tracking roll 15. Filter medium 11 may be of any conventional resilient flexible material such as woven or non-woven fabric or film of cotton, nylon, polyethylene, or other natural or synthetic materials as is known in the filtering art.

Figure 5:
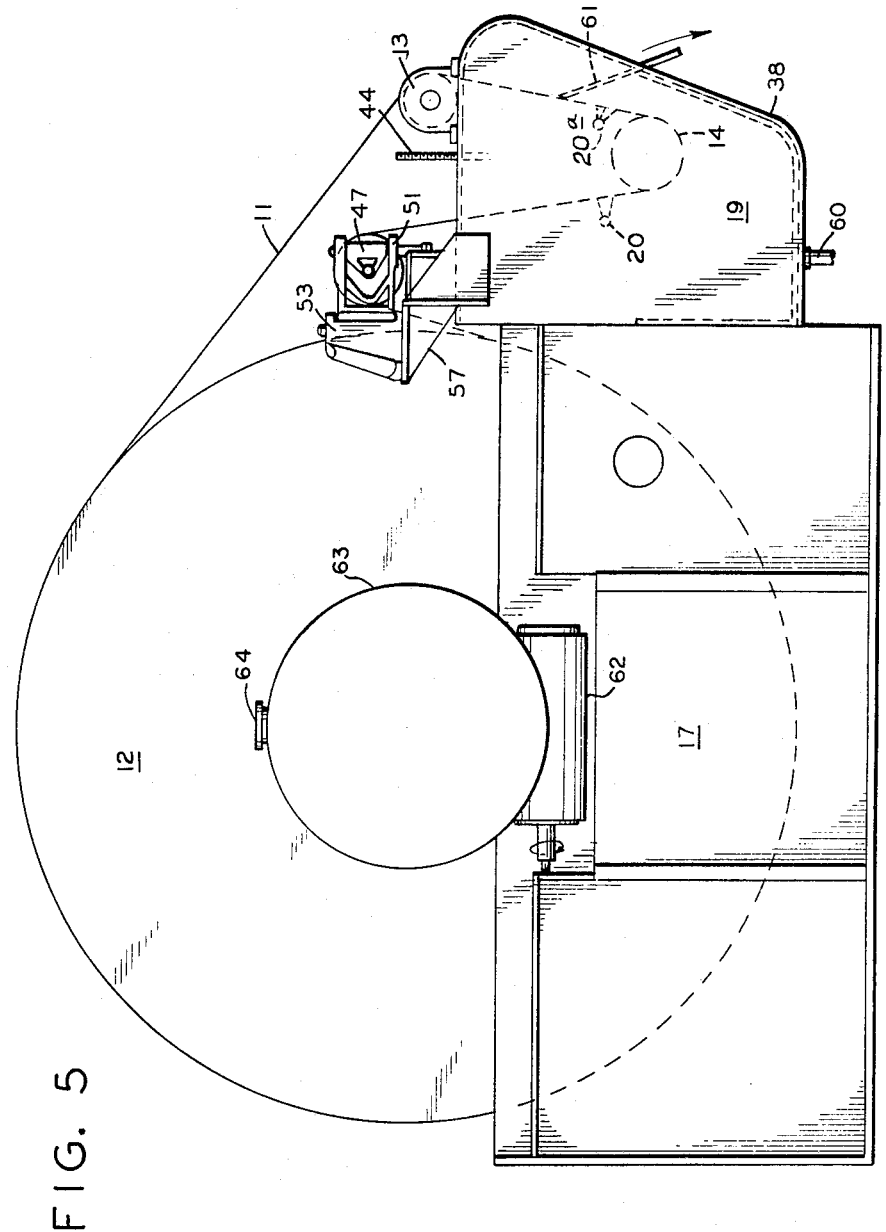
FIG. 5 is a side view of the filter unit taken from the far side of the unit shown in FIG. 4.

Rotating vacuum drum 12 is positioned within slurry tank 17 and is provided with suitable valve means to provide vacuum within drum 12 during the filtration and wash portions of the cycle and venting to the atmosphere during the portion of the cycle when belt 11 is removed from the surface of drum 12. Drum 12, as shown in FIG. 5 is driven by a conventional worm and worm wheel (such as shown in FIG. 1 of the U.S. patent to Robertson 2,598,606, May 27, 1952) enclosed within worm casing 62 and worm wheel casing 63 having inlet 64. Since mechanism for supporting rotating drum 12 in slurry tank 17 and since the valve means referred to are all well known expedients readily adaptable from the known rotary drum vacuum filters such as are illustrated and described on pages 1673 to 1677 of Chemical Engineers' Handbook, 2nd ed., edited by John H. Perry and published by McGraw-Hill Book Company in 1941, they have been omitted from the illustration to avoid unnecessarily complicating the drawing.

Tracking roll 15, which may be any appropriate type of roll for maintaining endless belt 11 in its proper lateral orientation on drum 12, is located so as to lay belt 11 directly on drum 12. A preferred construction for tracking roll 15 and its supports and controls is illustrated in U.S. Patent 2,722,415 issued Nov. 1, 1955 to G. B. Wood, Jr. Tracking roll 15 is mounted by suitable mounting means allowing for certain compensating movement of this roll. The operation of these tracking means are described more fully in connection with FIGURES 4, 5, 6 below. This motion is preferably performed in response to a means, not shown, for sensing the location of an edge of endless belt 11. Such an edge sensing device is likewise illustrated in the aforesaid patent to Wood.

Tension adjusting roll 14 is supported for free rotation at its ends in such a manner that the ends may be adjusted in the plane of the bisector of the angle formed between the portions of endless belt 11 approaching and leaving roll 14. This adjustment is provided to take up any slack which may occur in endless belt 11. Additionally, the two ends of tension adjusting roll 14 may be independently adjustable to correct for any possible tendency of one edge of endless belt 11 to lag behind the other edge of endless belt 11. This behavior will be explained more hereinafter.

Figure 2:
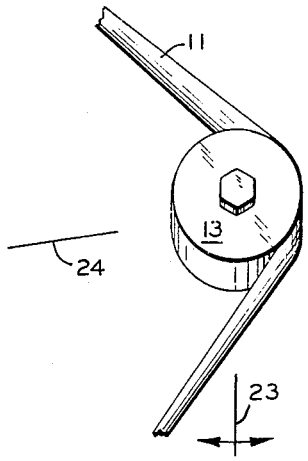
FIG. 2 is a magnified schematic view of the bowed cake discharge roll on the right-hand side of FIG. 1.
Figure 3:
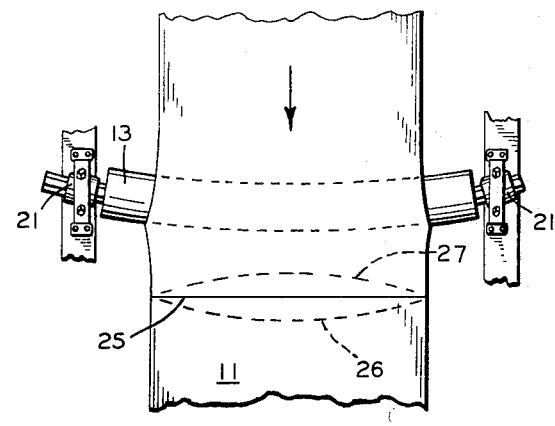
FIG. 3 is another view of the bowed cake discharge roll as seen from the right side of FIG. 2.

Bowed cake discharge roll 13, which is shown also in FIGS. 2 and 3, is not illustrated in detail since it may be of the type illustrated in U.S. Patent 2,393,191 issued Jan. 15, 1946 to J. D. Robertson which shows such a bowed roll having a stationary hexagonal axle on which a plurality of rotatable sections are supported, the whole being encased in a resiliently flexible surface tube. Roll 13 is supported by its curved axle in end blocks 21 in such a manner that the axle is held stationary but such axle may be rotated when desired for purposes to be explained hereinafter. Illustrative of a form of end supports having these characteristics, reference may be made to the aforesaid Robertson patent.

Below bowed cake discharge roll 13 may be positioned cake receiving hopper 18 which may be provided with any conventional means for disposing of the filter cake for further processing. Filter belt 11 may be cleansed by use of conventional wash sprays adjacent tension roll 14. Trough 19 is provided below roll 14 for the purpose of collecting such wash water.

In operation, endless traveling belt 11 passes over tracking roll 15 which lays belt 11 onto rotary vacuum drum 12 properly positioned laterally with respect to the edges of drum 12. Vacuum drum 12, which is rotated by power from a suitable source, not shown, carries endless filter belt 11 through a slurry to be filtered contained within slurry tank 17. Filter felt 11 containing thereon filter cake picked up by passage through slurry tank 17 then passes clockwise over the upper portion of drum 12 where the filter cake may be washed by suitable conventional sprays, not shown.

Endless filter belt 11 containing thereon the filter cake thus produced then passes over bowed roll 13 which performs two functions. Bowed roll 13, by being positioned with the plane of the bow 23 (see FIG. 2) substantially perpendicular to the bisector 24 of the angle formed by belt 11 approaching and leaving bowed roll 13, with the bow directed in the direction of motion of belt 11 (see FIG. 3), subjects belt 11 to a longitudinal flexing action and to a transverse stretching action as is best illustrated in FIG. 3. This concomitant flexing and stretching action greatly facilitates the release of filter cake from the surface of traveling belt 11.

In the normal construction of an endless belt, a length of material is provided with a seam, such as 25 (see FIG. 3), to join the ends of such material to each other. If, during the operation of traveling belt filter, the seam 25 should depart from its straight transverse position to produce a leading bow 26 or a lagging bow 27, correction for this so as to return the seam to a straight transverse line 25 may be accomplished by adjusting the plane 23 of the bow of bowed roll 13 toward or away from the angle bisector 24 as indicated by the double headed arrow in FIG. 2. A movement of the plane 23 of the bow toward the angle bisector 24 (to the left as illustrated in FIG. 2) would serve to correct for a lagging bow 27 as illustrated in FIG. 3 while the reverse motion of the plane 23 would correct for a leading bow 26.

After having the filter cake removed and the tendency for the center of endless belt 11 to lead or lag the edges of the endless belt 11 corrected by bowed roll 13, endless belt 11 then passes over tension adjusting roll 14. Tension adjusting roll 14 is adjustable to maintain the tension on endless belt 11 constant regardless of stretching or shrinkage in such belt. Also, by differential movement of the two ends of tension adjusting roll 14 correction can be made for the tendency of one edge of the seam of endless belt 11 to lead or lag the other edge of the seam of endless belt 11. Thus, complex deviations of the seam from a straight transverse line across the face of belt 11 can be corrected by conjoint action of bowed roll 13 and tension adjusting roll 14.

After leaving tension adjusting roll 14, endless belt 11 then returns to tracking roll 15. Adjacent to roll 14 is provided filter belt washing sprays 20 for cleaning the filter belt and reducing the tendency for the filter belt to blind with fine particles of the material being filtered becoming entrapped in the foramina in the filter medium 11.

Figure 4:
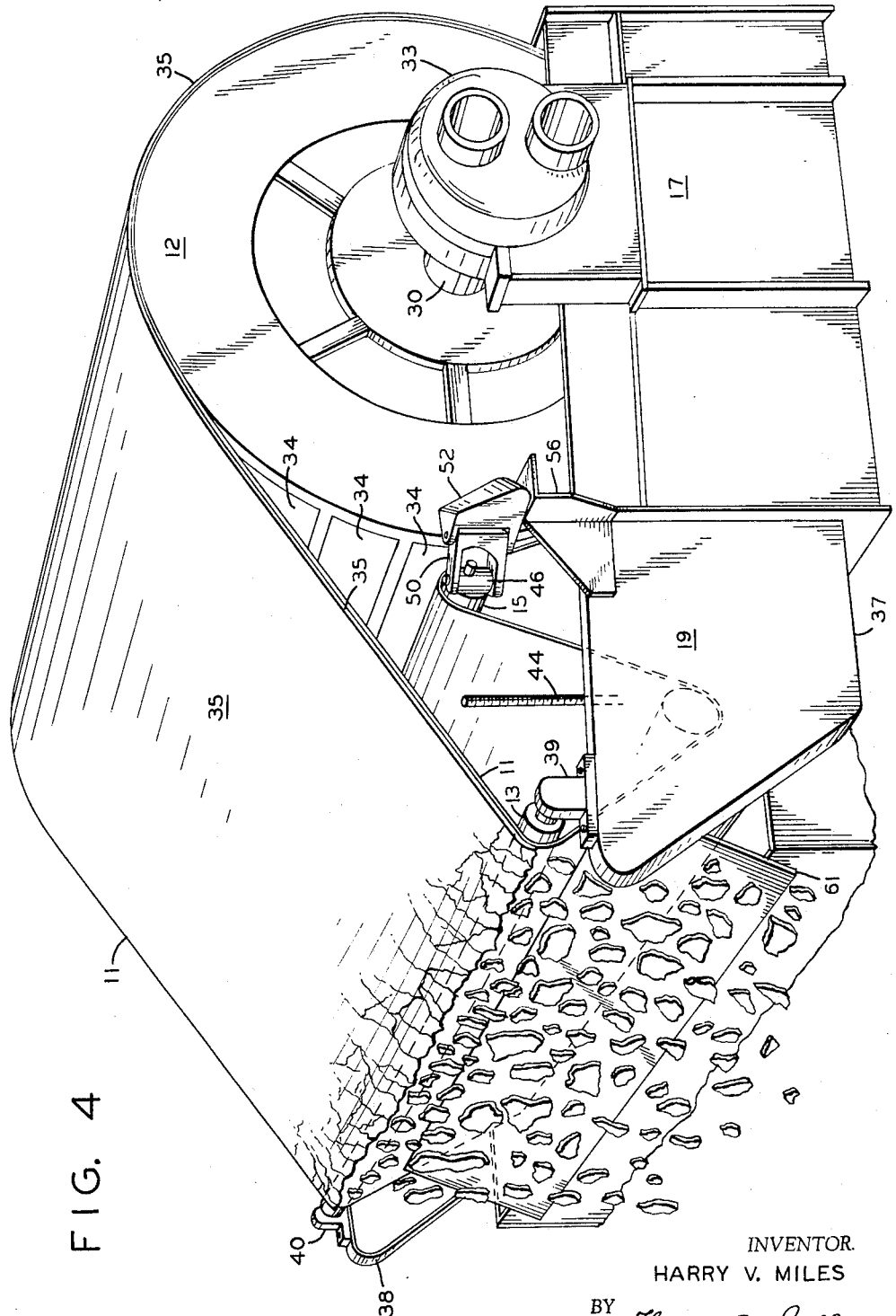
FIG. 4 is a semidiagrammatic view of the filter unit illustrating the improved manner of cake discharge.
Figure 6:
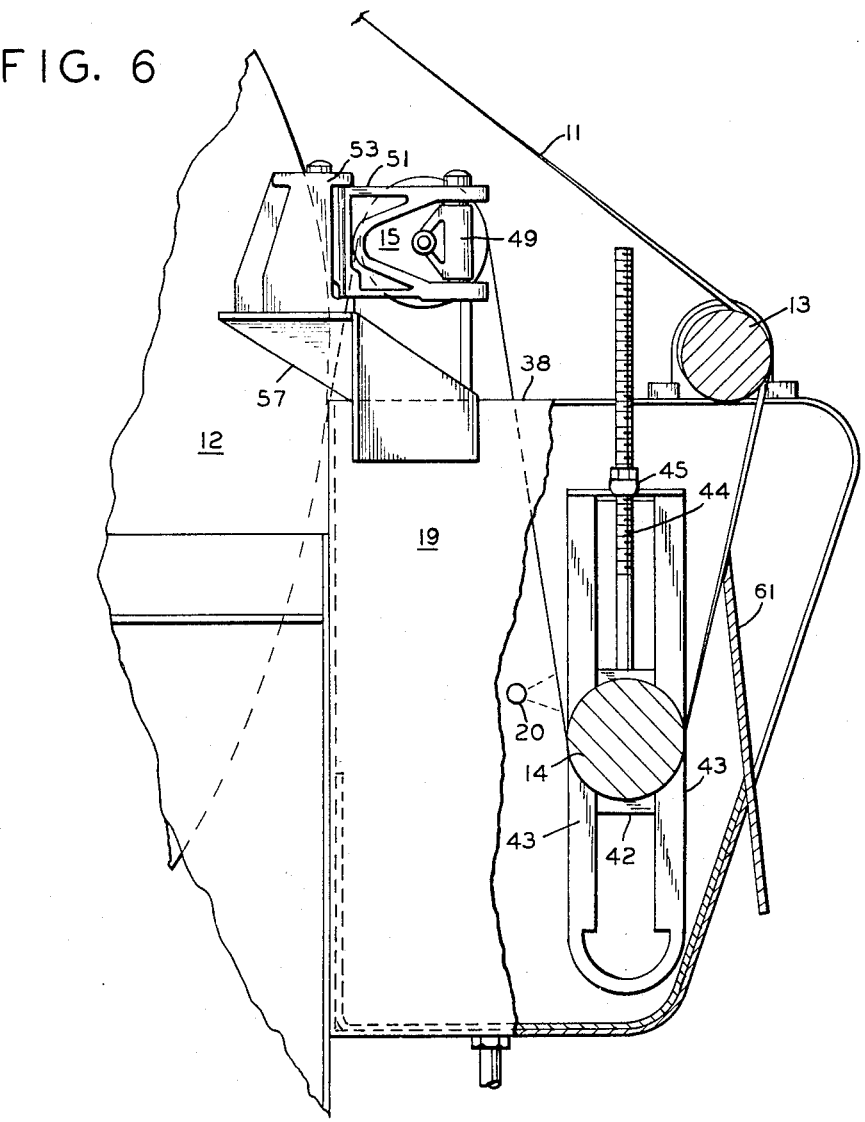
FIG. 6 is an enlarged and more detailed view of the guide roll arrangement for the filter belt shown in FIG. 5.

According to the semi-diagrammatic illustrations of the filter unit in FIGS. 4 to 6, the trunnions 30 of the filter drum 12 rotate in trunnion bearings mounted upon the side walls of filter tank 17 containing a bath of pulp or slurry in which the drum is immersed. The usual trunnion valve is shown at 33 controlling the vacuum filtration operation of the filter panels 34 on the drum during its rotation, which operation of itself is known to form a layer of filter cake 35 upon the travelling endless filter belt 11 surrounding a major portion of the drum 12. The slurry or pulp supply means for the tank are here not shown.

The tank has a pair of forwardly extending side wall extensions 37 and 38 serving to mount between them the guide roll system for the filter belt, comprising the bowed discharge roll 13, the tension roll 14 and the tracking roll 15.

The bowed discharge roll 13 has a fixed boxed axle held in bearings 39 and 40 although with the plane of the bowed axle angularly adjustable, as indicated in FIG. 3, but not elaborated in FIG. 4. These bearings are mounted atop the wall extensions 37 and 38. The tension roll 14 is rotatable at each end in a bearing block 42 (see FIG. 6) vertically adjustable between a pair of tracks 43 fastened to the respective wall extensions at the inner face thereof. A screw spindle 44 with lock-nut arrangement 45 serves in effecting vertical adjustment of the tension roll. The vertical adjustment feature of the tension roll, as described, is conventional and well known in the art.

The tracking roll 15 is rotatable in bearings 46 and 47 carried respectively by horizontally extending swivel arms 50 and 51 pivotally mounted on respective base members 52 and 53 swingable in a horizontal plane. The base members in turn are fastened to and supported by brackets 56 and 57 respectively, mounted upon the respective aforementioned wall extensions. The swivel arms represent a non-parallel link connection. A sensor arrangement (not shown) actuated by the lateral edges of the filter belt will move the links of this connection in such a way as to compensate for lateral deviations in the travel of the belt.

A wash spray pipe 20 directs wash water against the outside of the filter belt 11 after the same has left the tension roll 15. Another spray pipe 20a directs wash water against the inside of that portion of the belt extending between discharge roll 13 and tension roll 14. The spent wash water is caught in a trough 19 for disposal as through a bottom drain connection 60. The filter cake discharging over bowed roll 13 is deflected for disposal by means of a deflector plate 61.

From the foregoing description as well as from the perspective view in FIG. 4, it will be seen that with the filter belt kept sufficiently taut by means of the tension roll 14, improved cake discharge conditions are maintainable by the bowed roll 13 effecting expansion of the pores of the porous filter belt material in the direction transversely of the path of travel of the belt. In this way, the cake layer is broken up in the longitudinal as well as in the transverse direction in the region of the bowed roll, with the result that the broken up layer is effectively dislodged from the pores and from the filter belt, and that the filter belt stays cleaner longer, minimizing shutdown and belt replacements. More particularly, such improved cake discharge conditions are attributable to the fact that the convex side of the bowed roll causes a spreading of the filter belt material across the width thereof substantially in accordance with the expansion of said convex side coincident with a corresponding constriction of the concave side of the roll. A substantially uniform spreading of the belt material across its width is thus attainable.

It is thus seen that the objects of this invention have been achieved for a traveling web endless belt filter by the use of a bowed roll adjustably mounted as a filter cake discharge roll. It is readily apparent, however, that this invention is applicable in environments other than that in which it was developed. For example, it can be used as a filter cake discharge roll in traveling web filters wherein the traveling web is moved intermittently rather than continuously or wherein the traveling web is not an endless belt but is unwound from one supply roll and rewound on a second take-up roll after passage through a filtration zone and a filter cake discharge zone.

While the invention has been illustrated and described as embodied in a rotary drum filter apparatus, it is not intended to be limited to the details shown, since various modifications and structural changes may be made without departing from the spirit of the present invention.

Furthermore, as this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

I claim:
1. In a rotary drum filter apparatus having: support structure means; a filter drum mounted on said support structure means rotatable about a horizontal axis with the lower portion immersed in a bath of slurry; an endless traveling filter belt of porous filter material surrounding and engaging a major portion of the circumference of said drum so that the belt is moved by the rotation of said drum, said belt being effective to collect and hold a layer of solids from said bath to be removed from said belt in the operating cycle of said drum, said belt extending over a system of rotatable guide rolls mounted on said support structure means and rotated by said belt for guiding the belt away from the upper portion of the drum and back onto the lower portion of the drum at which said layer of solids is collected from the slurry bath, said system of guide rolls including a bowed discharge roll for discharging said layer of solids from said belt, said bowed roll extending transversely of said belt, and over which said belt makes a sharp bend longitudinally of the belt, the bow of said roll being bowed outwardly into the bend of said belt and extending substantially the width of the belt simultaneously to break up said layer of solids and to open said pores both longitudinally and transversely of the belt to release said solids and clear said pores.

2. The apparatus according to claim 1, wherein the plane of the bowed axle is held substantially perpendicular to the bisector of the angle formed by the portions of the belt respectively approaching and leaving the discharge roll and having the convex side directed substantially in the direction of travel of said belt.

3. The filter apparatus according to claim 1 in which said bowed roll includes a fixed bowed axle, a flexible cylindrical member surrounding said axle, and means mounting said flexible member for rotation on said axle while conforming to the bow of the axle.

References Cited by the Examiner

UNITED STATES PATENTS

| 2,393,191 | 1/1946 | Robertson | 26—63 |
| 2,722,415 | 11/1955 | Wood | 226—23 X |
| 2,812,064 | 11/1957 | Siebenthal | 210—401 X |
| 3,075,647 | 1/1963 | Davis | 210—401 |
| 3,120,492 | 2/1964 | Peterson | 210—401 |
| 3,143,502 | 8/1964 | Krynski | 210—401 |

FOREIGN PATENTS 207,240   3/1957   Australia.

REUBEN FRIEDMAN, *Primary Examiner.*

SAMIH ZAHARNA, *Examiner.*